S. P. HODGEN & J. W. YELTON.

Said YELTON assignor to said HODGEN.

Machine for Making Barrels.

No. 8,498. Reissued Nov. 19, 1878.

Witnesses
Fred G. Dieterich
George Binkenburg

Inventors
Samuel P. Hodgen,
John W. Yelton,
by DeWitt C. Allen,
Atty.

N. PETERS, PHOTO-LITHOGRAPHER, WASHINGTON, D. C.

UNITED STATES PATENT OFFICE.

SAMUEL P. HODGEN, OF MARTLING, MISSOURI, AND JOHN W. YELTON, OF DENVER, COLORADO; SAID YELTON ASSIGNOR TO SAID HODGEN.

IMPROVEMENT IN MACHINES FOR MAKING BARRELS.

Specification forming part of Letters Patent No. 178,928, dated June 20, 1876; Reissue No. 8,498, dated November 19, 1878; application filed November 4, 1878.

*To all whom it may concern:*

Be it known that we, SAMUEL PARK HODGEN, of Martling, in the county of Newton and State of Missouri, and JOHN WHEELER YELTON, formerly of Neosho City, in the county of Newton and State of Missouri, but now of Denver, Colorado, have invented certain new and useful Improvements in Machines for Making Hogsheads and Barrels; and we do hereby declare the following to be a full, clear, and exact description of the same, reference being made to the accompanying drawing, forming a part of this specification, and in which—

Figure 1:
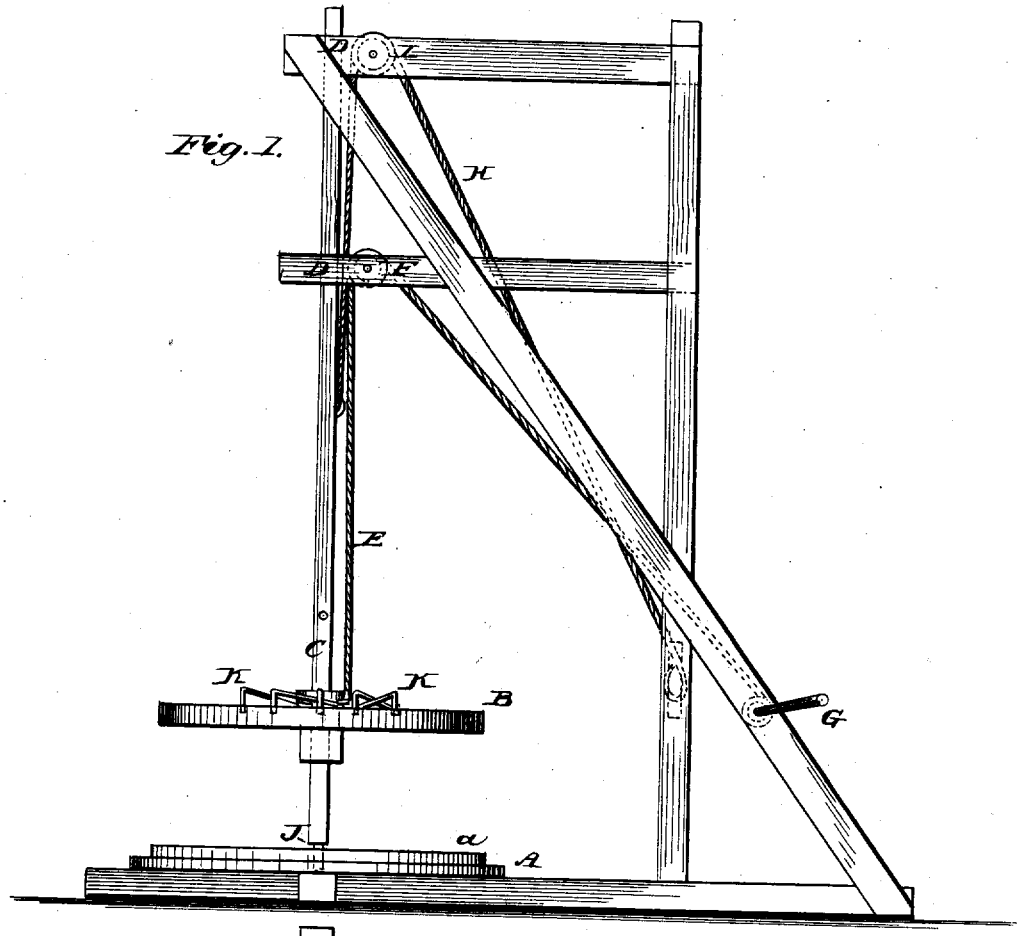
Figure 2:
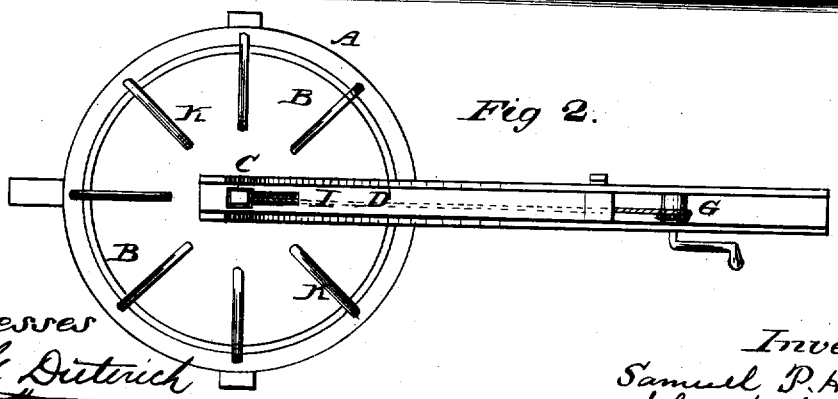

Figure 1 is a side elevation of our improved machine; Fig. 2, a top or plan view of the same.

This invention relates to improvements in machines for making hogsheads or barrels, and especially to the class of machines for setting up and hooping straight hogsheads or barrels; and the invention consists in the combination, with a platform, of a circular follower, and adjusting mechanism whereby said follower is adapted to be adjusted vertically within and out of the top of a hogshead or barrel, and for clinching the nails used in securing the hoops to the staves and joining them at the splice.

It also consists in the combination, with a platform and chine-board, of a circular follower, and adjusting mechanism whereby said follower is adapted to be adjusted vertically within and out of the top of a hogshead or barrel.

It further consists in the combination, with a platform, of a shaft, and follower mounted thereon, and adjusting mechanism whereby said shaft and follower are adapted to be adjusted vertically within and out of a hogshead or barrel.

It finally consists in the combination, with a platform, of a shaft, and a follower adjustably mounted on said shaft, and adjusting mechanism whereby said shaft and follower are adapted to be adjusted vertically within and out of the top of a hogshead or barrel, all as will be hereinafter fully described.

To enable others skilled in the art to make and use our invention, we will now proceed to describe the exact manner in which it is carried out.

In the drawing, A represents a circular platform, on which is a chine-board, *a*, over which is placed a circular follower, B, fitted to slide up and down on the shaft C, which is also capable of sliding up and down in the bearings D. The follower has a rope, E, attached to it, which passes over the pulley F to the windlass G, for raising and lowering the follower from time to time; and the shaft has a rope, H, passing over the pulley I, for raising it. The shaft also has a point, J, in the lower end, which sits in the lower head temporarily when the head is set on the chine-board, for setting up a hogshead, barrel, &c.

In setting up a hogshead or barrel, the staves are nailed to the lower head as they are set up, and are held at the top against the follower by a hoop supported by hooks K. Said hoop is nailed fast to the staves as they are placed in position, and nailed to the lower head. The hooks K are then loosed and folded in, and the follower is then let down, when it is in position for clinching the nails of the second hoop from the bottom, said follower being hooped with a band of iron, for clinching the nails driven against it. The hoops above are then nailed on in the same way, the follower being raised to correspond. The follower is then raised clear of the hogshead or barrel, and the rod or shaft C is also raised. Then the bottom hoop is nailed on, driving the nails through into the head. This enables the staves to be set upright and fitted round, so that the top head, being made of the proper size, and also round, will fit without special fitting, as the heads have to be when the hogsheads, &c., are set up in the ordinary way, on account of not being round.

Commonly a man has to get inside of the hogshead to hold a tool for clinching the nails, and assist in keeping the staves up straight, which is entirely obviated by our adjustable follower, and the work expedited.

The operation of our improved machine is as follows: The lower head of the hogshead or barrel is laid on chine-board *a*, shaft C lowered, and point J set in central hole of head. The follower B being then lowered, the end of each stave is set on platform A and nailed to the head, while a rope is passed around the hogshead or barrel above the follower, and drawn until the staves fit closely around said follower. Then the lower middle hoop is nailed to each stave, and the nails clinched by follower, the latter lapping the ends of the hoop. The follower is now, with the rope, raised to the place for nailing on the upper middle hoop and tightened while the hoop is nailed, as before. The follower and rope are then raised to the top of hogshead or barrel, tightened, and the top hoop nailed. The hogshead or barrel is then turned out on its side to receive the bottom hoop, through which the nails are driven into the head, and the top head, which is easily fitted, being of the same size as the bottom one.

We are aware that a circular adjustable table of less diameter than the head of a barrel, for supporting said head while placing the staves around the same, and also an adjustable table or hoop, against which the staves rest in the manufacture of bilge-barrels, are old, and such we do not desire to claim as our invention; but,

Having thus fully described all that is necessary to a full understanding of our invention, what we claim is—

1. In a machine for setting up and hooping straight hogsheads or barrels, the combination, with a platform, of a circular follower, and adjusting mechanism whereby said follower is adapted to be adjusted vertically within and out of the top of a hogshead or barrel, and for clinching the nails used in securing the hoops to the staves, and joining them at the splice, substantially as herein shown and described.

2. In a machine for setting up and hooping straight hogsheads or barrels, the combination, with a platform and chine-board, of a circular follower, and adjusting mechanism whereby said follower is adapted to be adjusted within and out of the top of a hogshead or barrel, substantially as and for the purpose herein shown and described.

3. In a machine for setting up and hooping straight hogsheads or barrels, the combination, with a platform, of a shaft, and follower mounted thereon, and adjusting mechanism whereby said shaft and follower are adapted to be adjusted within and out of the top of a hogshead or barrel, substantially as and for the purpose herein shown and described.

4. In a machine for setting up and hooping straight hogsheads and barrels, the combination, with a platform, of a shaft, and a follower adjustably mounted on said shaft, and adjusting mechanism whereby said follower and shaft are adapted to be adjusted within and out of the top of a barrel, substantially as and for the purpose herein shown and described.

SAMUEL PARK HODGEN.
JOHN WHEELER YELTON.

Witnesses as to signature of S. P. Hodgen:
E. H. BENHAM,
J. M. BIDDLE.

Witnesses as to signature of J. W. Yelton:
O. H. TITTMANN,
JOHN E. MCGRATH.